UNITED STATES PATENT OFFICE.

FRANZ O. MATTHIESSEN, OF IRVINGTON, NEW YORK.

PROCESS OF REFINING RAW SUGAR.

SPECIFICATION forming part of Letters Patent No. 477,670, dated June 28, 1892.

Application filed October 24, 1891. Serial No. 409,708. (No specimens.)

*To all whom it may concern:*

Be it known that I, FRANZ O. MATTHIESSEN, of Irvington, New York, have invented a certain Improvement in the Art of Refining Raw Sugar, of which the following is a specification.

In the ordinary method of sugar-refining the raw sugar is formed into a magma by mixture with water, white liquor, or sirup, and is then washed and drained in a centrifugal machine. By this means a raw sugar of, say, 82 per cent. purity is raised to a purity of 92 or 93 per cent.

It is the object of the present improvement to further increase the purity of the raw sugar before dissolving it to form the sugar-liquor. This is difficult of accomplishment by continuous prolonged washing, because a certain percentage of impurities imprisoned within the interstices between the aggregated crystals in the outer portion of the wall of sugar in the centrifugal machine cannot easily be dislodged therefrom by washing.

The method of effecting the desired object, which constitutes the present invention and which may be broadly designated as a "system of progressive purification," consists in, first, forming the raw sugar into a magma by mixing it with water, white liquor, or sirup in the ordinary manner and in then draining the resulting magma in the centrifugal machine, and, if necessary, washing it therein; secondly, in removing the wall of sugar from the centrifugal machine and forming it into a second magma by stirring and mixing it with water, white liquor, or sirup, and in then draining, and, also, if necessary, washing the second magma in the centrifugal machine, as before; thirdly, in again removing the wall of sugar from the centrifugal machine and forming it into a third magma by stirring and mixing it with water, white liquor, or sirup, and in then draining, and, if necessary, washing the third magma in a centrifugal machine. By thus forming a series of magmas by mixing the walls of sugar removed from the centrifugal machine with water, white liquor, or sirup the outer portions of the walls of sugar which, as remarked, contain the greater quantity of impurities are mechanically diffused throughout the entire mass of the resultant magma, from which it ensues that in the subsequent drainings further percentages of the previously-imprisoned impurities are readily dislodged and expelled. The product after the second draining is considerably improved in purity, and as a rule the product after the third draining is so nearly pure that when dissolved, filtered, concentrated, and granulated in the usual manner it can all be manufactured into white sugar. It will of course be understood that additional mixing and washing operations may be employed, if desired.

In practice the sirups resulting from the later washings of one lot of raw sugar can be used in forming the magmas for the earlier washings of another lot of raw sugar. The desired result can be greatly promoted by allowing the magmas to stand after mixing or by subjecting them to prolonged stirring.

Raw beet-sugar is sometimes so white that it can by the described process of progressive purification be suitably prepared for manufacture into granulated sugar without being dissolved in water and without washing. It will hence be understood that in the foregoing description of the process of progressive purification the washing of the magmas is referred to as an alternative, which may be usefully employed, when desired—as, for example, in the treatment of raw cane-sugar—but which will not always be necessary in the treatment of raw beet-sugar.

What is claimed as the invention is—

The herein-described method of effecting the refining of raw sugar by progressive purification, which consists, first, in forming the raw sugar into a magma by mixing it with water, white liquor, or sirup, and in draining the resulting magma in a centrifugal machine in the ordinary manner; secondly, in removing the wall of sugar from the centrifugal machine and forming it into a second magma by mixing it with water, white liquor, or sirup, and in subsequently draining the second magma in a centrifugal machine; thirdly, in removing the wall of sugar from the centrifugal machine after the second draining and forming it into a third magma, and subsequently draining the third magma in a centrifugal machine, as before, preparatory to manufacturing the purified product into merchantable sugar by the usual processes.

F. O. MATTHIESSEN.

Witnesses:
A. M. JONES,
E. GATTERER.